United States Patent
Ikeda

(10) Patent No.: US 11,867,526 B2
(45) Date of Patent: Jan. 9, 2024

(54) MAP GENERATION APPARATUS

(71) Applicant: Honda Motor Co., Ltd., Tokyo (JP)

(72) Inventor: Hayato Ikeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 17/676,189

(22) Filed: Feb. 20, 2022

(65) Prior Publication Data

US 2022/0276069 A1 Sep. 1, 2022

(30) Foreign Application Priority Data

Feb. 26, 2021 (JP) .................................. 2021-030150

(51) Int. Cl.
*G01C 21/00* (2006.01)
*G01C 21/36* (2006.01)

(52) U.S. Cl.
CPC ...... *G01C 21/3811* (2020.08); *G01C 21/3602* (2013.01); *G01C 21/3837* (2020.08)

(58) Field of Classification Search
CPC ............ G01C 21/3811; G01C 21/3602; G01C 21/3837; B60W 60/001; B60W 30/095; B60W 30/0956; B60W 40/00; B60W 40/02; B60W 40/06
See application file for complete search history.

(56) References Cited

U.S. PATENT DOCUMENTS

2020/0263994 A1* 8/2020 Lee ........................... G06T 7/74
2022/0185266 A1* 6/2022 Shah ................. B60W 30/0956

FOREIGN PATENT DOCUMENTS

CN 112348029 A * 2/2021 ............. G01C 21/32
JP 2013032953 A 2/2013

OTHER PUBLICATIONS

Machine Translation of CN112348029A (Year: 2021).*

* cited by examiner

*Primary Examiner* — Rachid Bendidi
*Assistant Examiner* — Sahar Motazedi
(74) *Attorney, Agent, or Firm* — Duft & Bornsen, PC

(57) ABSTRACT

A map generation apparatus generating a map for use in acquiring a position of a subject vehicle. The map generation apparatus includes: an in-vehicle detection unit configured to detect a situation around a subject vehicle in traveling; a microprocessor and a memory connected to the microprocessor. The microprocessor is configured to perform: extracting one or more feature points from a detection data acquired by the in-vehicle detection unit; generating a map with the feature points extracted from the detection data in the extracting; recognizing a landmark on the map generated in the generating; determining an importance of the landmark recognized in the recognizing; and correcting a number of the feature points included in the map generated in the generating, based on the importance determined in the determining.

11 Claims, 4 Drawing Sheets

MAP GENERATION APPARATUS

CROSS-REFERENCE TO RELATED APPLICATION

This application is based upon and claims the benefit of priority from Japanese Patent Application No. 2021-030150 filed on Feb. 26, 2021, the content of which are incorporated herein by reference.

BACKGROUND OF THE INVENTION

Field of the Invention

This invention relates to a map generation apparatus configured to generate a map for use in acquiring a position of a vehicle.

Description of the Related Art

As this type of device, there has been conventionally known a device that extracts a feature point from a captured image acquired by an in-vehicle camera while a subject vehicle is traveling, and stores a feature point image including the extracted feature point as reference data for use in acquiring the position of the subject vehicle (see, for example, JP 2013-32953 A (JP 2013-32953 A)).

Meanwhile, depending on the number of objects and the background included in the angle of view of the in-vehicle camera, the number of feature points included in the feature point image is increased, and accordingly, the data size of the feature point image is also increased. Thus, if the feature point image is merely stored as in the device described in JP 2013-32953 A, there is a possibility that the capacity of the memory device may be greatly used.

SUMMARY OF THE INVENTION

An aspect of the present invention is a map generation apparatus generating a map for use in acquiring a position of a subject vehicle. The map generation apparatus includes: an in-vehicle detection unit configured to detect a situation around a subject vehicle in traveling; a microprocessor and a memory connected to the microprocessor. The microprocessor is configured to perform: extracting one or more feature points from a detection data acquired by the in-vehicle detection unit; generating a map with the feature points extracted from the detection data in the extracting; recognizing a landmark on the map generated in the generating; determining an importance of the landmark recognized in the recognizing; and correcting a number of the feature points included in the map generated in the generating, based on the importance determined in the determining.

BRIEF DESCRIPTION OF THE DRAWINGS

The objects, features, and advantages of the present invention will become clearer from the following description of embodiments in relation to the attached drawings, in which.

DETAILED DESCRIPTION

An embodiment of the present invention will be described below with reference to FIGS. 1 to 4. A map generation apparatus according to the embodiment of the present invention can be applied to a vehicle including a self-driving capability, that is, a self-driving vehicle. It is to be noted that a vehicle to which the map generation apparatus according to the present embodiment is applied may be referred to as a subject vehicle as distinguished from other vehicles. The subject vehicle may be any of an engine vehicle including an internal combustion (engine) as a traveling drive source, an electric vehicle including a traveling motor as a traveling drive source, and a hybrid vehicle including an engine and a traveling motor as a traveling drive source. The subject vehicle can travel not only in a self-drive mode in which a driving operation by a driver is unnecessary, but also in a manual drive mode by the driving operation by the driver.

Figure 1:
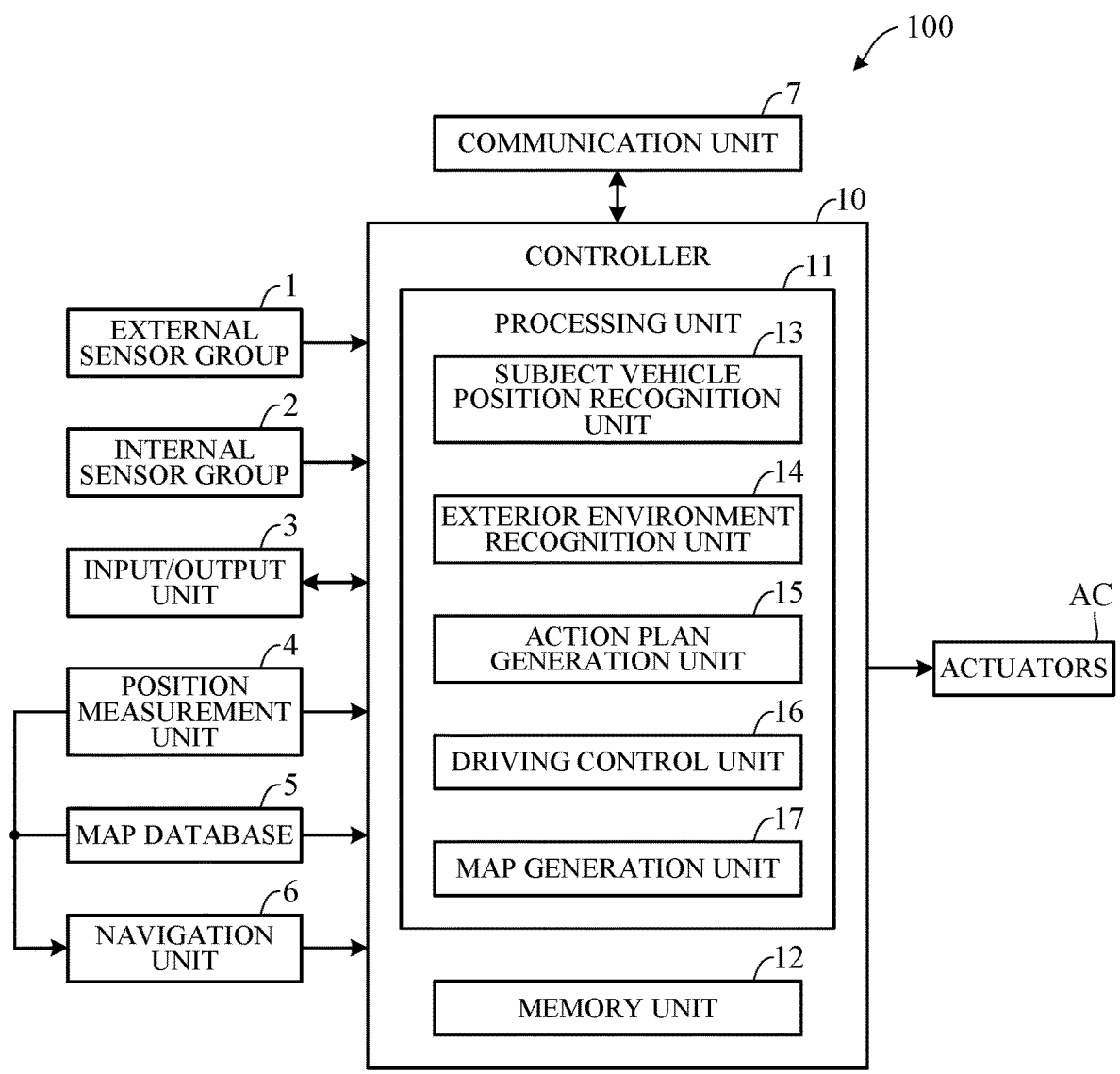
FIG. 1 is a block diagram schematically illustrating an overall configuration of a vehicle control system according to an embodiment of the present invention.

First, a schematic configuration related to self-driving will be described. FIG. 1 is a block diagram schematically illustrating an overall configuration of a vehicle control system 100 including a map generation apparatus according to the present embodiment of the present invention. As illustrated in FIG. 1, the vehicle control system 100 mainly includes a controller 10, an external sensor group 1, an internal sensor group 2, an input/output device 3, a position measurement unit 4, a map database 5, a navigation unit 6, a communication unit 7, and a traveling actuator AC each communicably connected to the controller 10.

The external sensor group 1 is a generic term for a plurality of sensors (external sensors) that detect an external situation which is peripheral information of a subject vehicle. For example, the external sensor group 1 includes a LiDAR that measures scattered light with respect to irradiation light in all directions of the subject vehicle and measures a distance from the subject vehicle to a surrounding obstacle, a radar that detects other vehicles, obstacles, or the like around the subject vehicle by irradiating electromagnetic waves and detecting a reflected wave, and a camera that is mounted on the subject vehicle and has an imaging element such as a CCD or a CMOS to image the periphery of the subject vehicle (forward, rearward and lateral).

The internal sensor group 2 is a generic term for a plurality of sensors (internal sensors) that detect a traveling state of the subject vehicle. For example, the internal sensor group 2 includes a vehicle speed sensor that detects a vehicle speed of the subject vehicle, an acceleration sensor that detects an acceleration in a front-rear direction of the subject vehicle and an acceleration in a left-right direction (lateral acceleration) of the subject vehicle, a revolution sensor that detects the number of revolution of the traveling drive source, a yaw rate sensor that detects a rotation angular speed around a vertical axis of the center of gravity of the subject vehicle, and the like. The internal sensor group 2 further includes a sensor that detects driver's driving operation in a manual drive mode, for example, operation of an accelerator pedal, operation of a brake pedal, operation of a steering wheel, and the like.

The input/output device 3 is a generic term for devices to which a command is input from a driver or from which information is output to the driver. For example, the input/output device 3 includes various switches to which the driver inputs various commands by operating an operation member, a microphone to which the driver inputs a command by voice, a display that provides information to the driver with a display image, a speaker that provides information to the driver by voice, and the like.

The position measurement unit (GNSS unit) 4 has a positioning sensor that receives a positioning signal transmitted from a positioning satellite. The positioning satellite is an artificial satellite such as a GPS satellite or a quasi-zenith satellite. The position measurement unit 4 measures a current position (latitude, longitude, altitude) of the subject vehicle by using the positioning information received by the positioning sensor.

The map database 5 is a device that stores general map information used in the navigation unit 6, and is constituted of, for example, a hard disk or a semiconductor element. The map information includes road position information, information on a road shape (curvature or the like), position information on intersections and branch points, and information on a speed limit set for the road. The map information stored in the map database 5 is different from highly accurate map information stored in a memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated based on a current position of the subject vehicle measured by the position measurement unit 4 and the map information stored in the map database 5. The current position of the subject vehicle can be measured using the detection values of the external sensor group 1, and the target route may be calculated on the basis of the current position and the highly accurate map information stored in the memory unit 12.

The communication unit 7 communicates with various servers (not illustrated) via a network including a wireless communication network represented by the Internet network, a mobile phone network, or the like, and acquires map information, traveling history information, traffic information, and the like from the servers periodically or at an arbitrary timing. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated.

The actuator AC is a traveling actuator for controlling traveling of the subject vehicle. In a case where the traveling drive source is an engine, the actuator AC includes a throttle actuator that adjusts an opening (throttle opening) of a throttle valve of the engine. When the traveling drive source is a traveling motor, the traveling motor is included in the actuator AC. The actuator AC also includes a brake actuator that operates a braking device of the subject vehicle and a steering actuator that drives a steering device.

The controller 10 includes an electronic control unit (ECU). More specifically, the controller 10 includes a computer that has a processing unit 11 such as a central processing unit (CPU) (microprocessor), a memory unit 12 such as a read only memory (ROM) and a random access memory (RAM), and other peripheral circuits (not illustrated) such as an input/output (I/O) interface. Although a plurality of ECUs having different functions such as an engine control ECU, a traveling motor control ECU, and a braking device ECU can be separately provided, in FIG. 1, the controller 10 is illustrated as a set of these ECUs for convenience.

The memory unit 12 stores highly accurate detailed map information (referred to as highly accurate map information). The highly accurate road map information includes road position information, information of a road shape (curvature or the like), information of a road gradient, position information of an intersection or a branch point, information of the number of lanes, width of a lane and position information for each lane (information of a center position of a lane or a boundary line of a lane position), position information of a landmark (traffic lights, signs, buildings, etc.) as a mark on a map, and information of a road surface profile such as unevenness of a road surface. The highly accurate map information stored in the memory unit 12 includes map information acquired from the outside of the subject vehicle via the communication unit 7, for example, information of a map (referred to as a cloud map) acquired via a cloud server, and information of a map created by the subject vehicle itself using detection values by the external sensor group 1, for example, information of a map (referred to as an environmental map) including point cloud data generated by mapping using a technology such as simultaneous localization and mapping (SLAM). The memory unit 12 also stores information on information such as various control programs and a threshold used in the programs.

The processing unit 11 includes a subject vehicle position recognition unit 13, an exterior environment recognition unit 14, an action plan generation unit 15, a driving control unit 16, and a map generation unit 17 as functional configurations.

The subject vehicle position recognition unit 13 recognizes the position (subject vehicle position) of the subject vehicle on a map, based on the position information of the subject vehicle, obtained by the position measurement unit 4, and the map information of the map database 5. The subject vehicle position may be recognized using the map information stored in the memory unit 12 and the peripheral information of the subject vehicle detected by the external sensor group 1, whereby the subject vehicle position can be recognized with high accuracy. When the subject vehicle position can be measured by a sensor installed on the road or outside a road side, the subject vehicle position can be recognized by communicating with the sensor via the communication unit 7.

The exterior environment recognition unit 14 recognizes an external situation around the subject vehicle, based on the signal from the external sensor group 1 such as a LiDAR, a radar, and a camera. For example, the position, traveling speed, and acceleration of a surrounding vehicle (a forward vehicle or a rearward vehicle) traveling around the subject vehicle, the position of a surrounding vehicle stopped or parked around the subject vehicle, the positions and states of other objects and the like are recognized. Other objects include signs, traffic lights, markings (road markings) such as division lines and stop lines of roads, buildings, guardrails, utility poles, signboards, pedestrians, bicycles, and the like. The states of other objects include a color of a traffic light (red, green, yellow), the moving speed and direction of a pedestrian or a bicycle, and the like. A part of the stationary object among the other objects constitutes a landmark serving as an index of the position on the map, and the exterior environment recognition unit 14 also recognizes the position and type of the landmark.

The action plan generation unit 15 generates a driving path (target path) of the subject vehicle from a current point of time to a predetermined time ahead based on, for example, the target route calculated by the navigation unit 6, the subject vehicle position recognized by the subject vehicle position recognition unit 13, and the external situation recognized by the exterior environment recognition unit 14. When there are a plurality of paths that are candidates for the target path on the target route, the action plan generation unit 15 selects, from among the plurality of paths, an optimal path that satisfies criteria such as compliance with laws and regulations and efficient and safe traveling, and sets the selected path as the target path. Then, the action plan generation unit 15 generates an action plan corresponding to the generated target path. The action plan generation unit 15 generates various action plans corresponding to traveling modes, such as overtaking traveling for overtaking a preceding vehicle, lane change traveling for changing a travel lane, following traveling for following a preceding vehicle, lane keeping traveling for keeping the lane so as not to deviate from the travel lane, deceleration traveling, or acceleration traveling. When the action plan generation unit 15 generates the target path, the action plan generation unit 15 first determines a travel mode, and generates the target path based on the travel mode.

In the self-drive mode, the driving control unit 16 controls each of the actuators AC such that the subject vehicle travels along the target path generated by the action plan generation unit 15. More specifically, the driving control unit 16 calculates a requested driving force for obtaining the target acceleration for each unit time calculated by the action plan generation unit 15 in consideration of travel resistance determined by a road gradient or the like in the self-drive mode. Then, for example, the actuator AC is feedback controlled so that an actual acceleration detected by the internal sensor group 2 becomes the target acceleration. More specifically, the actuator AC is controlled so that the subject vehicle travels at the target vehicle speed and the target acceleration. In the manual drive mode, the driving control unit 16 controls each actuator AC in accordance with a travel command (steering operation or the like) from the driver acquired by the internal sensor group 2.

The map generation unit 17 generates the environmental map constituted by three-dimensional point cloud data with the use of detection values detected by the external sensor group 1 during traveling in the manual drive mode. Specifically, an edge indicating an outline of an object is extracted from a captured image acquired by the camera 1*a* based on luminance and color information for each pixel, and a feature point is extracted using the edge information. The feature point is, for example, an intersection of the edges, and corresponds to a corner of a building, a corner of a road sign, or the like. The map generation unit 17 sequentially plots the extracted feature points on the environmental map, thereby generating the environmental map around the road on which the subject vehicle has traveled. The environmental map may be generated by extracting the feature point of an object around the subject vehicle with the use of data acquired by radar or LiDAR instead of the camera. In addition, when generating the environmental map, the map generation unit 17 determines whether or not a landmark such as a traffic light, a sign, or a building as a mark on the map is included in the captured image acquired by the camera by, for example, pattern matching processing. When it is determined that the landmark is included, the position and the type of the landmark on the environmental map are recognized based on the captured image. The landmark information is included in the environmental map and stored in the memory unit 12.

The subject vehicle position recognition unit 13 performs subject vehicle position estimation processing in parallel with map creation processing by the map generation unit 17. That is, the position of the subject vehicle is acquired based on a change in the position of the feature point over time. In addition, the subject vehicle position recognition unit 13 estimates the subject vehicle position, based on a relative positional relationship with landmarks around the subject vehicle. The map creation processing and the position estimation processing are simultaneously performed, for example, according to an algorithm of SLAM. The map generation unit 17 can generate the environmental map not only when the vehicle travels in the manual drive mode but also when the vehicle travels in the self-drive mode. If the environmental map has already been generated and stored in the memory unit 12, the map generation unit 17 may update the environmental map with a newly obtained feature point.

Now, in the case of recognizing (estimating) the subject vehicle position, the subject vehicle position recognition unit 13 first extracts a feature point from the captured image including a landmark within the angle of view acquired by the camera 1*a*. Then, the extracted feature point is collated (matched) with the environmental map (point cloud data) to recognize a landmark (feature point corresponding to the landmark) on the environmental map. Next, the subject vehicle position recognition unit 13 calculates the distance between the subject vehicle and the landmark, based on the position of the landmark on the captured image, and estimates the position of the subject vehicle on the environmental map, based on the calculated distance and the position of the landmark on the environmental map. In this case, as the number of feature points constituting the environmental map is increased, the accuracy of matching is improved, and the subject vehicle position can be estimated more accurately. In contrast, when the number of feature points constituting the environmental map is increased, the data amount of the environmental map is increased, and the capacity of the storage device is greatly used. Thus, a map generation apparatus is configured as follows according to the present embodiment, so as to reduce the data amount of the environmental map while suppressing the decrease in the estimation accuracy of the subject vehicle position.

Figure 2:
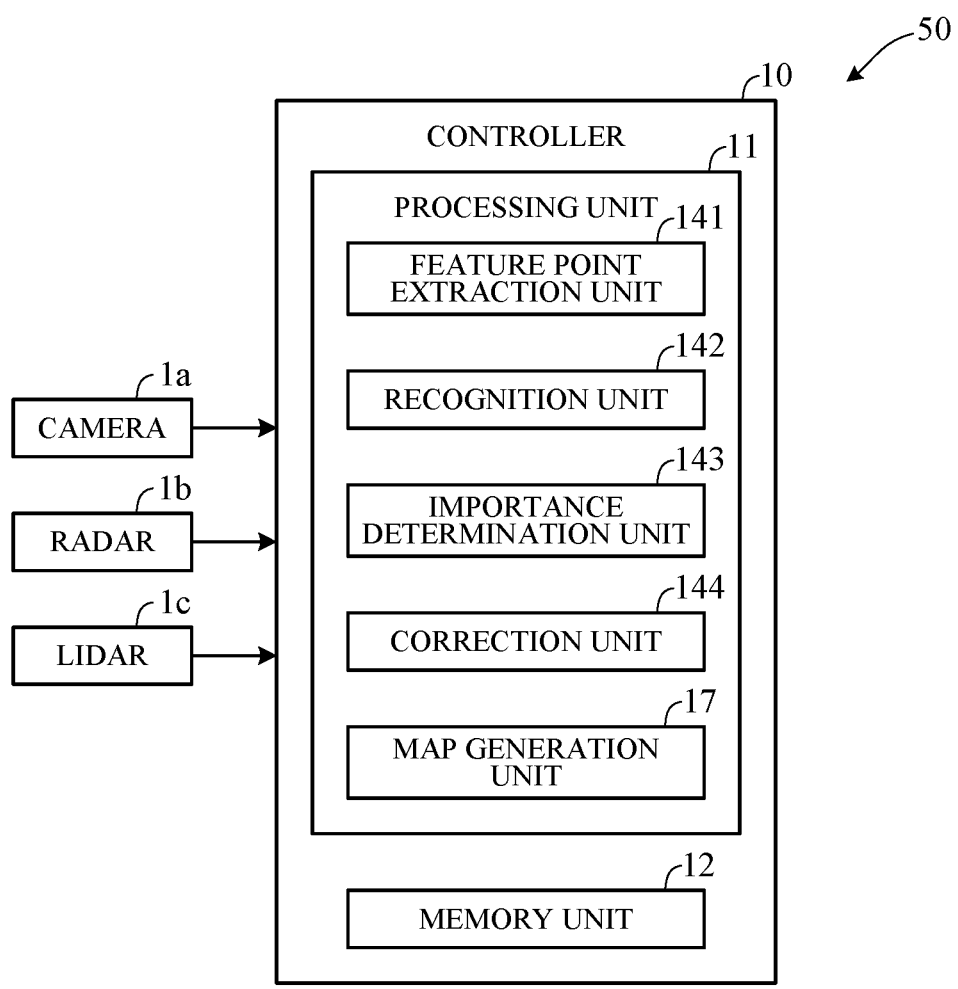
FIG. 2 is a block diagram illustrating a main part configuration of a map generation apparatus according to an embodiment of the present invention.

FIG. 2 is a block diagram illustrating a main part configuration of a map generation apparatus 50 according to the present embodiment of the present invention. The map generation apparatus 50 generates a point cloud map (environmental map) based on a feature point extracted from the captured image of the camera 1*a*, and constitutes a part of the vehicle control system 100 of FIG. 1. As illustrated in FIG. 2, the map generation apparatus 50 includes a controller 10, a camera 1*a*, a radar 1*b*, and a LiDAR 1*c*.

The camera 1*a* is a monocular camera having an imaging element (image sensor) such as a CCD or a CMOS, and constitutes a part of the external sensor group 1 in FIG. 1. The camera 1*a* may be a stereo camera. The camera 1*a* images the surroundings of the subject vehicle. The camera 1*a* is mounted at a predetermined position, for example, in front of the subject vehicle, and continuously captures an image of a space in front of the subject vehicle to acquire image data (hereinafter, referred to as captured image data or simply as a captured image) of the object. The camera 1*a* outputs the captured image to the controller 10. The radar 1*b* is mounted on the subject vehicle and detects other vehicles, obstacles, and the like around the subject vehicle by irradiating with electromagnetic waves and detecting reflected waves. The radar 1b outputs the detection value (detection data) to the controller 10. The LiDAR 1c is mounted on the subject vehicle, and measures scattered light with respect to irradiation light in all directions of the subject vehicle and then detects the distances from the subject vehicle to surrounding vehicles obstacles. The LiDAR 1c outputs the detection value (detection data) to the controller 10.

The controller 10 includes a feature point extraction unit 141, a recognition unit 142, an importance determination unit 143, a correction unit 144, and a map generation unit 17 as a functional configuration undertaken by the processing unit 11 (FIG. 1). The feature point extraction unit 141, the recognition unit 142, the importance determination unit 143, and the correction unit 144 are constituted by, for example, the exterior environment recognition unit 14 in FIG. 1.

Figure 3A:
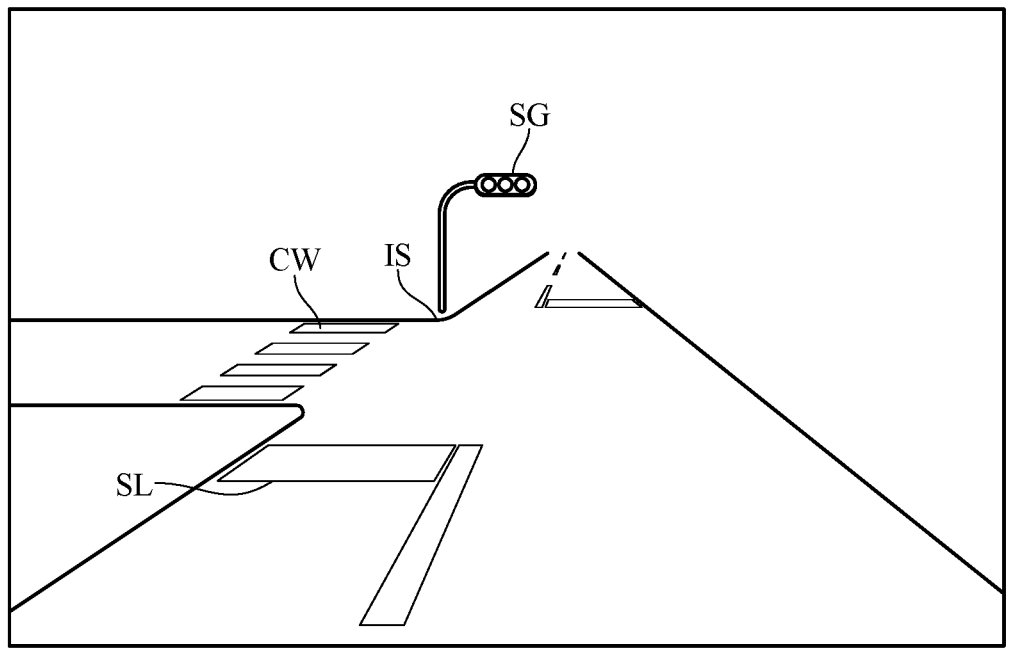
FIG. 3A is a diagram illustrating an example of captured image acquired by a camera.
Figure 3B:
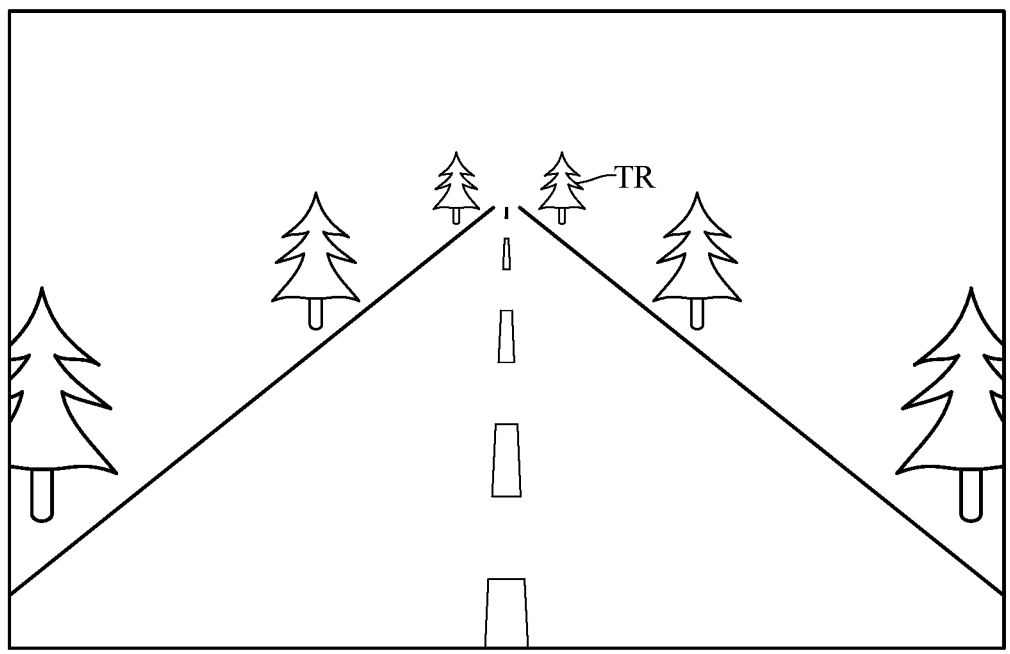
FIG. 3B is a diagram illustrating another example of captured image acquired by a camera.

The feature point extraction unit 141 extracts feature points from captured images acquired by the camera 1a. More specifically, the feature point extraction unit 141 extracts a feature point from each of captured images acquired by the camera 1a on a frame-by-frame basis (hereinafter, referred to as frame images or simply as frames in some cases). FIGS. 3A and 3B are diagrams each illustrating an example of the captured image acquired by the camera 1a. The recognition unit 142 recognizes landmarks on the map, included in the captured image acquired by the camera 1a. For example, in the case where the captured image acquired by the camera 1a is the image shown in FIG. 3A, an intersection IS, a traffic light SG, a stop line SL, a crosswalk CW, and the like are recognized as landmarks.

The importance determination unit 143 determines the degrees of importance of the landmarks recognized by the recognition unit 142. In the case of travelling at a point with the intersection IS, the traffic light SG, the stop line SL, the crosswalk CW, and the like present, as illustrated in FIG. 3A, a higher position estimation accuracy is required from the viewpoint of safety. More specifically, the distances between the landmarks and the subject vehicle are required to be calculated more accurately. Thus, the importance determination unit 143 sets the degrees of importance for the landmarks to the highest level "high". In contrast, the degrees of importance for objects that are not treated as landmarks such as trees TR and roadside planting as illustrated in FIG. 3B are set to the lowest level "low". In addition, the degrees of importance for landmarks that are not included in an intersection, a traffic light, or the like, such as a road sign and a building, are set to a level "medium" between "high" and "low". Note that the example in which the levels of the importance are set in the three stages of "high", "medium", and "low" is used for simplification of the description, but the levels of the importance may be other than the three stages.

The importance determination unit 143 recognizes the speed limit set for a road on which the subject vehicle is current traveling, based on the map information and the like stored in the map database 5. The importance determination unit 143 sets a range (section on the road) to which the determined degree of importance is applied, based on the recognized speed limit. In this regard, the importance determination unit 143 sets, as the range to which the importance is applied, a section from the current position of the subject vehicle to a point that is distant in the travelling direction by the distance determined depending on the speed limit. In general, as the traveling speed of the subject vehicle is increased, the moving speed of the feature point on the captured image is increased, thereby making it difficult to collate the feature point on the captured image with the feature point on the environmental map. Thus, the importance determination unit 143 sets a wider range (section) to which the importance is applied as the speed limit is higher, such that the feature point is collated with higher accuracy. The importance determination unit 143 stores, in the memory unit 12, information (hereinafter, referred to as importance information) that represents the determined importance and the application range of the importance, included in the environmental map.

The correction unit 144 corrects the number of feature points by decimating the feature points on the environmental map, based on the importance information stored in the memory unit 12. Specifically, the correction unit 144 corrects the number of feature points such that the number of feature points in the section to which the importance is applied is reduced as the importance is lower. More specifically, the correction unit 144 reduces the number of feature points of each frame acquired by the camera 1a (feature points extracted from each frame by the feature point extraction unit 141) in the section to which the importance is applied. In addition, the correction unit 144 sets the number of frames between key frames, that is, a key frame interval D, based on the importance information stored in the memory unit 12. The key frame is a frame selected from among the respective frames acquired by the camera 1a, based on the key frame interval D, and among the feature points extracted from the respective frames by the feature point extraction unit 141, the feature point extracted from the key frame is stored in the environmental map. Accordingly, as the key frame interval is reduced, the number of feature points is increased. Specifically, the correction unit 144 sets the key frame interval D such that the key frame interval D in the section to which the importance is applied is reduced as the importance is higher.

Figure 4:
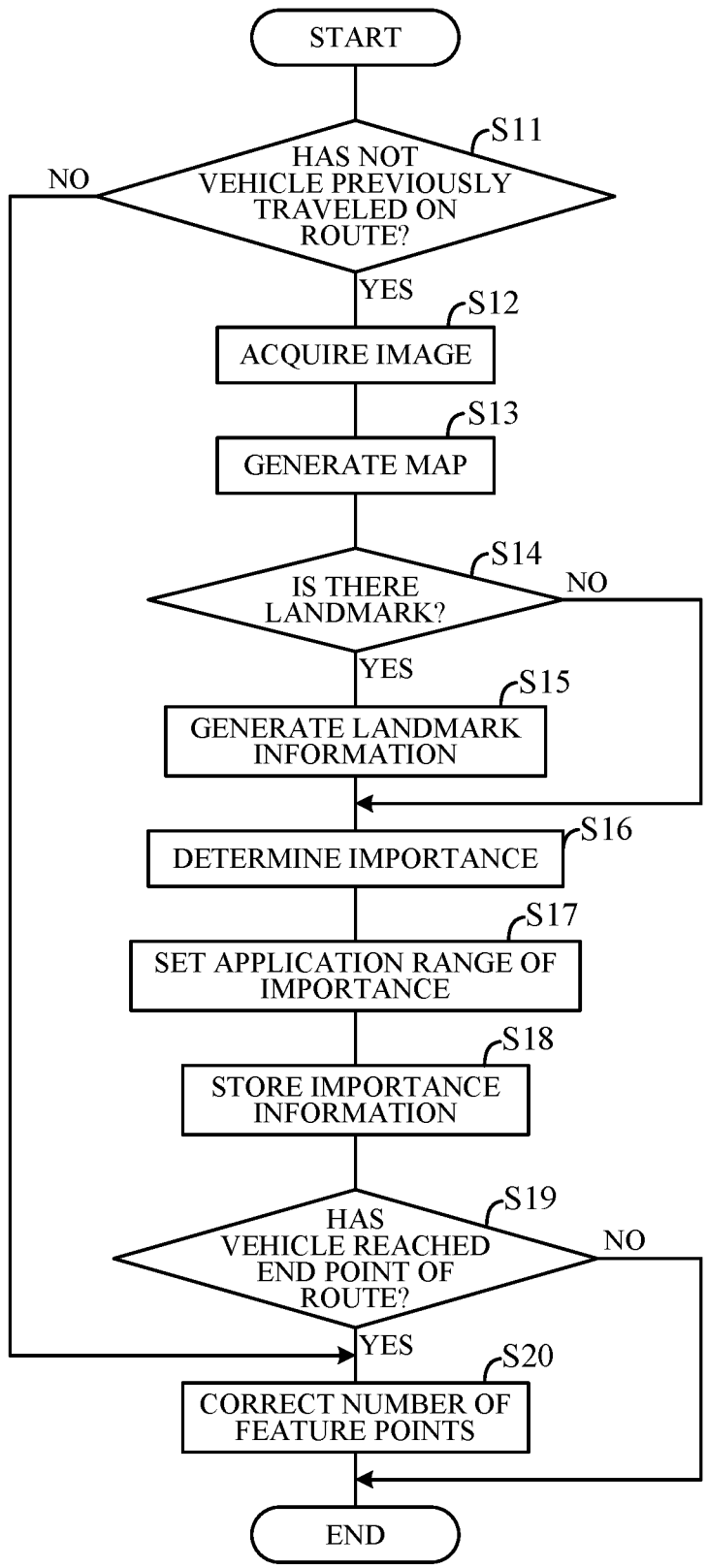
FIG. 4 is a flowchart illustrating an example of processing executed by the controller in FIG. 2.

FIG. 4 is a flowchart illustrating an example of processing executed by the controller 10 in FIG. 2 according to a predetermined program, particularly an example of processing regarding map generation. A case where the subject vehicle travels on a route RT will be described below as an example. The route RT is, for example, a route from the user's home to a predetermined point (for example, a workplace or a hospital). The processing illustrated in the flowchart of FIG. 4 is repeated in a predetermined cycle while the subject vehicle travels on the route RT in the manual drive mode.

First, in S11 (S: processing step), whether the subject vehicle 101 has previously traveled on the route RT or not, that is, whether the subject vehicle 101 travels for the first time or not is determined. If the determination is affirmative in S11, the captured image acquired by the camera 1a is acquired in S12. Then, in S13, feature points are extracted from the captured image acquired in S12. In this regard, feature points are extracted at the key frame interval D corresponding to the initial value "low" of the importance. Then, an environmental map is generated based on the extracted feature points. Specifically, the extracted feature points are plotted on the environmental map. In S14, whether a landmark such as a traffic light, a sign, or a building as an index of the position on the map is included in the captured image acquired in S12 or not is determined by, for example, processing of pattern matching.

If the determination is negative in S14, the processing proceeds to S16. If the determination is affirmative in S14, the position and type (such as an intersection or a traffic light) of the landmark on the environmental map are recognized in S15, based on the captured image acquired in S12. In this regard, information (landmark information) that represents the position and type of the landmark is generated and stored in the memory unit 12 as a part of the environmental map or as accompanying data of the environmental map. In S16, the importance of the landmark is determined based on the type of landmark recognized in S15. Note that, if the captured image acquired in S12 is an image as illustrated in FIG. 3B, that is, an image including no landmark, the landmark is not recognized in S15, and the importance is thus determined to be "low".

In S17, the application range of the importance determined in S16 is set based on the speed limit set for the road on which the subject vehicle is currently traveling. In S18, information (importance information) that represents the importance determined in S16 and the application range set in S17 is generated, and stored in the memory unit 12 as a part of the environmental map or accompanying data of the environmental map. Note that if the importance information including the current traveling position of the subject vehicle in the application range is already stored in the memory unit 12 at the time of executing S14, the processing of S14 to S18 (the processing of generating the importance information) may be skipped.

In S19, whether the subject vehicle has reached a predetermined point, that is, the end point of the route RT or not is determined. If the determination is negative in S19, the processing ends. If the determination is affirmative in S19, the feature points on the environmental map, generated while on the route RT are decimated based on the importance information stored in the memory unit 12 to correct the number of feature points constituting the environmental map in S20. For example, the feature points are deleted such that the number of feature points corresponding to each frame acquired by the camera 1a is ⅓ in the section with the importance "low" applied thereto. The feature points are deleted such that the number of feature points corresponding to each frame acquired by the camera 1a is ½ in the section with the importance "middle" applied thereto. In contrast, the number of feature points in the section with the importance "high" applied thereto is not changed. In addition, for example, the key frames are deleted such that the key frame interval D of the section with the importance "low" applied thereto increases threefold. The key frames are deleted such that the key frame interval D of the section with the importance "middle" applied thereto increases twofold. In contrast, the key frame interval D in the section with the importance "high" applied thereto is not changed.

Note that although the processing of S12 to S18 is executed in the first travel on the route RT in the flowchart of FIG. 4, the processing of S12 to S18 may also be executed in the second and subsequent travel on the route RT. Thus, the environmental map and importance information of the route RT can be updated. In addition, although S20 is executed when the subject vehicle reaches the end point of the route RT in the flowchart of FIG. 4, S20 may be executed at a predetermined timing while the subject vehicle is traveling on the route RT. For example, S20 may be executed every time the subject vehicle travels a predetermined distance while traveling on the route RT. In addition, for example, S20 may be executed every time the subject vehicle travels for a predetermined period of time while traveling on the route RT. Note that in the case where S20 is executed while the subject vehicle is traveling on the route RT, the feature points in a rear section that is sufficiently distant from the current position of the subject vehicle are decimated. Specifically, a section for a predetermined distance with, as a start position, a point at least a predetermined distance distant from the current position of the subject vehicle is determined as a processing target for S20.

In addition, in the flowchart of FIG. 4, the landmark information is generated in S14 to S15, and the importance information is stored in S16 to S18. In the case where the landmark information corresponding to the route RT is acquired from the outside of the subject vehicle and already stored in the memory unit 12, however, the processing of S14 to S18 may be skipped. In such a case, if the determination is affirmative in S19, that is, when the environmental map corresponding to the route RT is generated, the processes of S16 to S18 may be executed based on the landmark information corresponding to the route RT, and then the processing may proceed to S20. The processing can be simplified by using the existing landmark information as described above.

According to the embodiment of the present invention, the following advantageous effects can be obtained:

(1) The map generation apparatus 50 that generates a map for use in acquiring the position of a subject vehicle includes: the camera 1a that detects a situation around the subject vehicle; the feature point extraction unit 141 that extracts feature points from detection data (captured image) acquired by the camera 1a; the map generation unit 17 that generates a map with the use of the feature points extracted from the captured image; the recognition unit 142 that recognizes landmarks on the map generated by the map generation unit 17; the importance determination unit 143 that determines the importance of the landmarks recognized by the recognition unit 142; and the correction unit 144 that corrects the number of feature points included in the map generated by the map generation unit 17, based on the importance determined by the importance determination unit 143. Thus, the data amount of the map information can be reduced while keeping the accuracy of the map information from being decreased.

(2) The correction unit 144 reduces the number of feature points included in the map generated by the map generation unit 17, based on the importance determined by the importance determination unit 143. In addition, the correction unit 144 increases the interval between the key frames included in the map generated by the map generation unit 17 such that the number of feature points is reduced as the importance determined by the importance determination unit 143 is lower. Furthermore, the importance determination unit 143 determines, depending on the type of the landmark recognized by the recognition unit 142, the importance of the landmark. This makes it possible to further keep the accuracy of the map information from being decreased.

(3) The correction unit 144 sets a section on the road to which the importance is applied, based on the speed limit set for the road on which the subject vehicle is traveling, and corrects, based on the importance, the number of feature points corresponding to the set section among the feature points included in the map generated by the map generation unit 17. Thus, even in a section in which the traveling speed of the subject vehicle is assumed to be increased to increase the moving speed of the feature point on the captured image of the camera 1a, the feature point on the captured image can be accurately collated with the feature point on the environmental map, and the number of feature points can be appropriately corrected.

The above embodiment may be modified into various forms. Hereinafter, some modifications will be described. According to the embodiment mentioned above, the camera 1a is configured to detect the situation around the subject vehicle, however, the in-vehicle detector may have any configuration as long as the situation around the subject vehicle is detected. For example, the in-vehicle detector may be the radar 1b or the LiDAR 1c. In addition, although the processing illustrated in FIG. 4 is executed while traveling in the manual drive mode according to the embodiment mentioned above, the processing illustrated in FIG. 4 may be executed while traveling in the self-drive mode. In addition, while the importance is determined in S16 depending on the type of the landmark recognized in S15 according to the embodiment mentioned above, the method for determining the importance is not limited thereto. For example, if multiple landmarks are recognized in S15, the type of each landmark may be recognized to determine the importance of each landmark. Further, the statistic of the importance of each landmark may be included in the importance information. For example, with the importance "high", the importance "medium", and the importance "low" regarded respectively as 3, 2, and 1, the statistic (average value or median value) of the importance of each landmark may be calculated, and the calculation result may be included in the importance information. In addition, based on the statistic of the importance of each landmark calculated in this manner, the number of feature points may be corrected in S20. More specifically, if multiple landmarks are recognized by the recognition unit 142, the importance determination unit may determine the importance of each landmark, based on the type of each landmark. In addition, the correction unit may calculate a statistic of the importance of each landmark, and based on the calculated statistic, correct the number of feature points included in the map generated by the map generation unit 17.

In addition, in the above embodiment, although the map generation apparatus 50 is applied to the self-driving vehicle, the map generation apparatus 50 is also applicable to vehicles other than the self-driving vehicle. For example, the map generation apparatus 50 can also be applied to a manual drive vehicle including advanced driver-assistance systems (ADAS).

The present invention also can be configured as a map generation method generating a map for use in acquiring a position of a subject vehicle including: extracting one or more feature points from a detection data acquired by an in-vehicle detection unit detecting a situation around a subject vehicle in traveling; generating a map with the feature points extracted from the detection data in the extracting; recognizing a landmark on the map generated in the generating; determining an importance of the landmark recognized in the recognizing; and correcting a number of the feature points included in the map generated in the generating, based on the importance determined in the determining.

The above embodiment can be combined as desired with one or more of the above modifications. The modifications can also be combined with one another.

The present invention can reduce the data amount of the map information while keeping the accuracy of the map information from being decreased.

Above, while the present invention has been described with reference to the preferred embodiments thereof, it will be understood, by those skilled in the art, that various changes and modifications may be made thereto without departing from the scope of the appended claims.

What is claimed is:

1. A vehicle control system generating a map for use in acquiring a position of a subject vehicle to control traveling of the subject vehicle based on the map, the vehicle control system comprising:
a camera configured to detect a situation around the subject vehicle in traveling;
a traveling actuator for controlling the traveling of the subject vehicle; and
a microprocessor and a memory connected to the microprocessor and storing the map, wherein
the microprocessor is configured to perform:
extracting one or more feature points from detection data acquired by the camera;
generating the map with the feature points extracted from the detection data; and
controlling the traveling actuator so that the subject vehicle travels along a target route calculated based on the map;
the microprocessor is configured to further perform:
recognizing a landmark on the map;
determining an importance of the landmark so that the higher a location estimation accuracy of the subject vehicle required based on a viewpoint of safety, the higher the importance of the landmark;
applying the importance of the landmark to a section on a road from a current position of the subject vehicle to a point that is distant in a traveling direction by a distance determined based on a speed limit set for the road on which the subject vehicle is traveling; and
correcting a number of the feature points included in the map corresponding to the section on the road based on the importance of the landmark.

2. The vehicle control system according to claim 1, wherein
the correcting includes reducing the number of the feature points included in the map such that the number of the feature points is reduced as the importance of the landmark is lower.

3. The vehicle control system according to claim 1, wherein
the correcting includes increasing an interval between key frames included in the map such that the number of the feature points is reduced as the importance of the landmark.

4. The vehicle control system according to claim 1, wherein
the determining includes determining the importance of the landmark further depending on a type of the landmark.

5. The vehicle control system according to claim 4, wherein
the determining includes determining, when a plurality of landmarks are recognized, the importance of each landmark based on the type of each landmark, and
the correcting includes calculating a statistic of the importance of each landmark to correct, based on the calculated statistic, the number of the feature points included in the map.

6. A vehicle control system generating a map for use in acquiring a position of a subject vehicle to control traveling of the subject vehicle based on the map, the vehicle control system comprising:
a camera configured to detect a situation around the subject vehicle in traveling;
a traveling actuator for controlling the traveling of the subject vehicle; and a microprocessor and a memory connected to the microprocessor and storing the map, wherein
the microprocessor is configured to perform as:
a feature point extraction unit configured to extract one or more feature points from detection data acquired by the camera;
a map generation unit configured to generate the map with the feature points extracted from the detection data; and
a driving control unit configured to control the traveling actuator so that the subject vehicle travels along a target route calculated based on the map;
the microprocessor is configured to further perform as:
a recognition unit configured to recognize a landmark on the map;
an importance determination unit configured to determine an importance of the landmark so that the higher a location estimation accuracy of the subject vehicle required based on a viewpoint of safety, the higher the importance of the landmark; and
a correction unit configured to apply the importance of the landmark to a section on a road from a current position of the subject vehicle to a point that is distant in a traveling direction by a distance determined based on a speed limit set for the road on which the subject vehicle is traveling, and to correct a number of the feature points included in the map corresponding to the section on the road based on the importance of the landmark.

7. The vehicle control system according to claim 6, wherein
the correction unit corrects the number of the feature points included in the map such that the number of the feature points is reduced as the importance of the landmark is lower.

8. The vehicle control system according to claim 6, wherein
the correction unit corrects the number of the feature points included in the map such that the number of the feature points is reduced as the importance of the landmark is lower by increasing an interval between key frames included in the map.

9. The vehicle control system according to claim 6, wherein
the importance determination unit determines the importance of the landmark further depending on a type of the landmark.

10. The vehicle control system according to claim 9, wherein
the importance determination unit determines, when a plurality of landmarks are recognized, the importance of each landmark based on the type of each landmark, and
the correction unit calculates a statistic of the importance of each landmark to correct, based on the calculated statistic, the number of the feature points included in the map.

11. A vehicle control method generating a map for use in acquiring a position of a subject vehicle in which a camera detecting a situation around the subject vehicle in traveling, and a traveling actuator for controlling the traveling of the subject vehicle are installed to control the traveling of the subject vehicle based on the map, the method comprising:
extracting one or more feature points from detection data acquired by the camera;
generating the map with the feature points extracted from the detection data;
controlling, by a microprocessor, the traveling actuator so that the subject vehicle travels along a target route calculated based on the map;
recognizing a landmark on the map;
determining an importance of the landmark so that the higher a location estimation accuracy of the subject vehicle required based on a viewpoint of safety, the higher the importance of the landmark;
applying the importance of the landmark to a section on a road from a current position of the subject vehicle to a point that is distant in a traveling direction by a distance determined based on a speed limit set for the road on which the subject vehicle is traveling; and
correcting a number of the feature points included in the map corresponding to the section on the road based on the importance of the landmark.

* * * * *